Feb. 5, 1924.
W. C. E. CARLSON
1,482,382
EXTRICATING DEVICE FOR MOTOR VEHICLES
Filed Aug. 19, 1922
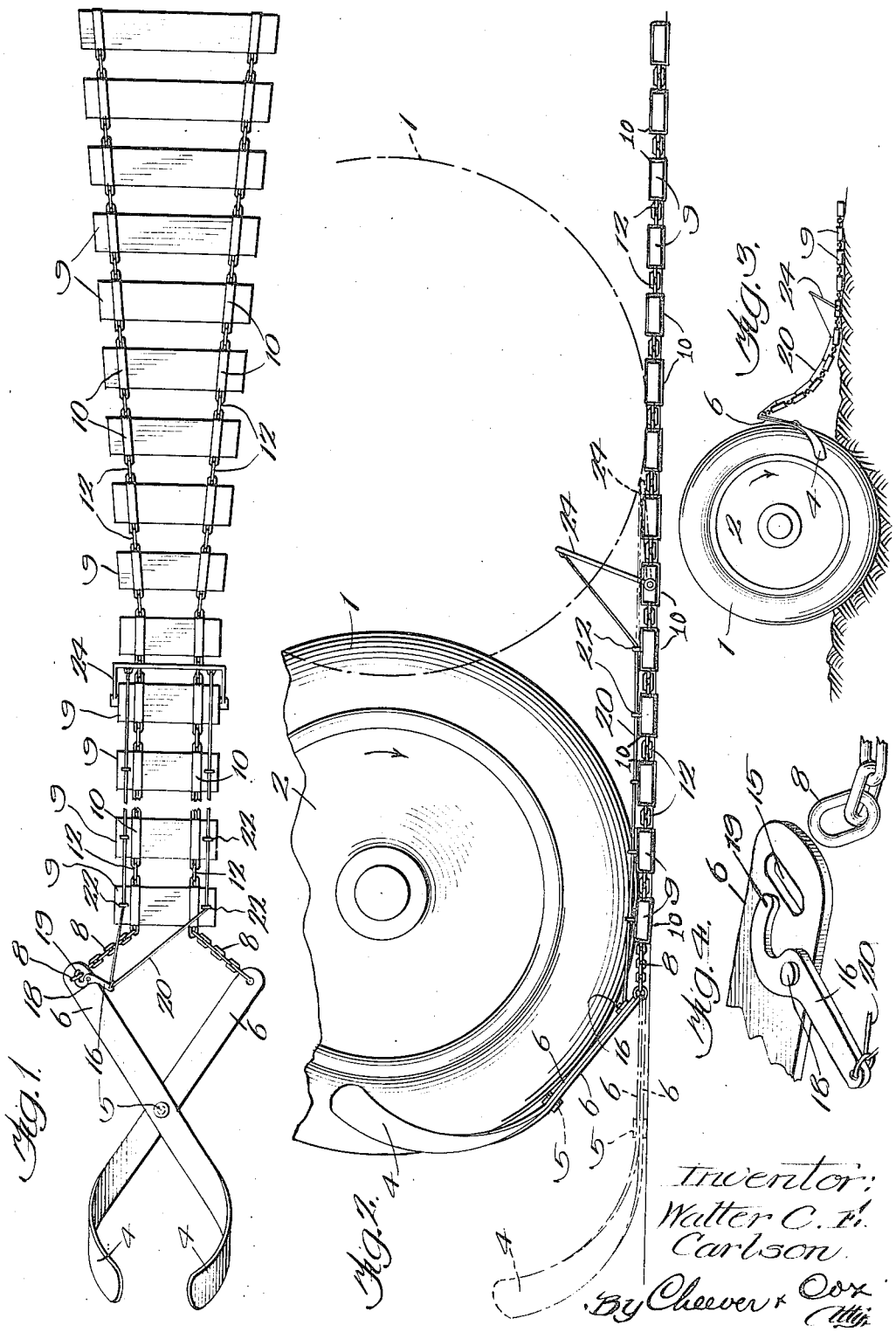
Inventor:
Walter C. E.
Carlson
By Cheever + Cox
Attys Patented Feb. 5, 1924.

1,482,382

UNITED STATES PATENT OFFICE.

WALTER C. E. CARLSON, OF CHICAGO, ILLINOIS.

EXTRICATING DEVICE FOR MOTOR VEHICLES.

Application filed August 19, 1922. Serial No. 582,872.

*To all whom it may concern:*

Be it known that I, WALTER C. E. CARLSON, a subject of the King of Sweden, residing at Chicago, in the county of Cook and State of Illinois, have invented a certain new and useful Improvement in Extricating Devices for Motor Vehicles, of which the following is a specification.

My invention relates to devices for extricating wheels of motor vehicles from the mire, and one of the objects of the invention is to provide a mat which may be detachably attached to the periphery of the wheel so that when the wheel rotates the mat may be drawn down beneath the wheel, thus becoming "inserted," as it were, between the wheel and the mud, so that the mat may form a track upon which the wheel may roll. Another object is to provide fastening means so constructed that the greater the resistance offered by the mat to being drawn under the wheel, the greater will be the gripping action of the clamp on the wheel. Still another object is to provide means by which the clamp will be automatically released after the wheel has traveled a certain distance on the mat, thus preventing the clamp from interfering with the fender or being drawn too far around on the wheel.

I obtain these objects by the mechanism illustrated in the accompanying drawings, in which—

Figure 1 is a top plan view of the device.

Figure 2 is a side elevation showing the manner of applying the device to the vehicle wheel.

Figure 3 is similar to Figure 2 except that it is drawn on a smaller scale and shows the clamp in the position which it will first occupy in preparation for being drawn under the wheel.

Figure 4 is a perspective view showing a part of the releasing device for enabling the clamp to let go after it has served its purpose of drawing the mat sufficiently far under the wheel.

Like numerals denote like parts throughout the several views.

The form of the clamp will be varied in accordance with the form of the vehicle wheel. For the sake of illustration I have shown in Figures 2 and 3 an ordinary motor vehicle wheel having a pneumatic tire 1. In the present case this tire is secured to a disc 2, which constitutes the wheel proper. The device is intended primarily to be applied to a driving wheel of a motor vehicle, that is, one of the wheels which furnish the tractive effect. The clamp designed for the particular type of vehicle wheel illustrated has two gripping members 4 adapted to conform approximately to and engage opposite sides of the tire. These gripping members are pivoted together by a pin 5, and each has an arm 6 extending beyond the pivot and forming a lever for operating them. The free ends of the levers are connected by chains 8 or other flexible members to what may be termed a "mat." This mat, according to the illustrated design, comprises a number of parallel slats 9 having clips 10 flexibly connected together by links 12 or other appropriate means. In any event the mat forms a track upon which the vehicle wheel may roll. It is desirable that the slats nearest to the clamping device shall be shorter than the ones at the far end, the purpose being to facilitate the first slats to enter into the rut in which the wheel may be stalled. The longer slats, which the wheel reaches later, furnish a broader supporting surface and prevent the wheel from sinking into the mire. The chains 8 extend obliquely inward from the ends of the levers 6 toward the adjacent end of the mat, the result being that when the clamp attempts to move bodily away from the mat, the chains will tend to draw the attached ends of the levers together and correspondingly tighten the grip of the clamping members upon the sides of the tire. In other words, the clamp is so connected to the mat that the greater the pull of the wheel the greater will be the gripping action of the clamp upon the wheel.

With respect to the operation of the parts thus far described: It is well known that a mired drive wheel will frequently spin without advancing the vehicle. If there is any such tendency when my device is present the result will be to tighten the grip of the clamp upon the tire and thus insure the drawing of the mat down into position where it will lie between the vehicle and the mud, and furnish a track upon which the wheel may advance forward and upward out of the rut. Figure 3 illustrates one manner of applying the device. According to this method the operator stands in front of the wheel and adjusts the two jaws 4 to the sides of the tire. He then takes hold of the levers 6 and by their aid holds the jaws in close contact with the tire. The result is that the wheel if rotating will begin to move the clamp, thus exerting tension on the chains 8 and producing the double action of drawing the mat under the wheel and at the same time increasing the pressure of the gripping members upon the tire.

I have provided means whereby the clamp will be automatically released from the tire as soon as the vehicle wheel has ridden fairly onto the mat. By referring to Figure 4 it will be seen that one of the levers 6 is provided with a slot 15 through which the end link of one of the chains 8 will be inserted. A latch 16 is pivotally secured by a pin 18 to the lever and in such position that the nose 19 of said latch may be inserted through the projecting end of the link. The opposite end of the latch is secured to cords 20 which pass through eyelets 22 in the opposite ends of the slats 9. At the forward end these cords are attached to a bail 24 which is pivoted to the ends of one of the slats and normally stands upright as illustrated in full lines in Figures 1, 2 and 3. The parts are so arranged that when the wheel moves relatively forward toward the dotted line position (Figure 2) it will strike bail 24 and thereupon throw it down flatwise, to the position shown in dotted lines in Figure 2. This will pull on the cords 20 and move latch 16 to the position shown in Figure 4, that is, the nose 19 of the latch will be withdrawn from link 8, thus permitting the link to slip down through the slot. This disconnects the chain from one side of the clamp lever with the result that there is nothing to hold the clamp in acting position and it releases the wheel. It thereupon falls to the ground as shown in dotted lines in Figure 2. Thus there is no danger that the clamp will be drawn too far or will interfere with the fender or any other part of the vehicle.

From the foregoing it will be evident that my device may be readily applied to a vehicle wheel after the same is deeply mired and without requiring any great effort on the part of the operator. It is not necessary for the operator to dig away a space in front of the wheel in order to insert the mat. The rotation of the wheel draws the mat under and the greater the resistance of the mat, the greater will be the gripping action of the clamp upon the tire. The action is therefore self-compensating in this respect. As soon as the wheel is fairly upon the mat or has traveled a short distance on it, the releasing mechanism will take effect and the clamp will automatically release the wheel, thus dropping down into the roadway and becoming entirely free from the vehicle.

Having thus described my invention, what I claim as new and desire to secure by Letters Patent is:

1. A device for extricating vehicle wheels from the mud, consisting of a mat, and a self tightening clamp adapted to grip the sides of the wheel, said clamp having lever arms pivoted together and connected to the mat whereby the gripping action will be automatically increased if the wheel slips on the mat while rotating in forward direction.

2. A device for extricating the wheels of motor vehicles from the mire consisting of a mat, a clamp adapted to grip the sides of the wheel and having obliquely arranged lever arms pivoted together and extending toward the mat divergingly, and elements connecting the forward end of the lever arms with the rear end of the mat and converging as they approach the mat.

3. A device for extricating vehicle wheels from the mire having a mat on which the wheel is adapted to roll, said mat including transverse slats flexibly connected together, a clamp for engaging the sides of the vehicle wheels, said clamp having lever arms for increasing the pressure of the clamp on the wheel if the wheel slips on the mat when rotating in a forward direction, and means for disconnectibly connecting the mat to the levers, said means including a latch, a bail mounted on a mat in position to be acted upon by the wheel in rolling forward along the mat and connecting means between the bail and the latch.

4. A device for extricating vehicle wheels from the mire including a mat on which the wheel is adapted to roll, tongs adapted at one end to grip the wheel and at the other end having links connecting them to the mat on opposite sides of the median line whereby the tongs automatically grip the wheel when the wheel tends to rotate away from the mat.

In witness whereof, I have hereunto subscribed my name.

WALTER C. E. CARLSON.